United States Patent [19]

Iwatani

[11] 4,032,450

[45] June 28, 1977

[54] FILTER PRESS

[75] Inventor: Akitoshi Iwatani, Marugame, Japan

[73] Assignee: Ishigaki Kiko Co., Ltd., Tokyo, Japan

[22] Filed: July 17, 1975

[21] Appl. No.: 596,613

[30] Foreign Application Priority Data

Dec. 24, 1974 Japan .............................. 49-2478
Jan. 27, 1975 Japan .............................. 50-11756

[52] U.S. Cl. .............................................. 210/230
[51] Int. Cl.$^2$ ...................................... B01D 25/00
[58] Field of Search .......... 210/224, 225, 227, 230, 210/DIG. 15; 100/110–115, 219, 242

[56] References Cited

UNITED STATES PATENTS

| | | | |
|---|---|---|---|
| 749,140 | 1/1904 | Hack | 210/230 X |
| 1,331,350 | 2/1920 | Miller | 210/230 |
| 1,589,834 | 6/1926 | Bisbee | 210/230 |
| 1,889,225 | 11/1932 | Sperry | 210/225 |
| 2,933,190 | 4/1960 | Peterson | 210/230 |
| 3,562,155 | 2/1969 | Rademacher et al. | 210/224 |
| 3,767,052 | 10/1973 | Shibasaki | 210/225 |

OTHER PUBLICATIONS

Sperry Filter Presses, D. R. Sperry & Co., Batavia, Ill., July, 1957, pp. 15, 26, 30, 31, 32, 36, 37.

Primary Examiner—Theodore A. Granger

[57] ABSTRACT

In the filter press of the type in which a plurality of movable frame members are arranged between a pair of heads with at least one filter cloth supported therebetween, one of the heads of the press is movably supported so that the movable head may be advanced and retracted by a hydraulic cylinder for tightening the frame members, being carried out under a condition that the heads are closest to each other so that the frame members are tightened and the cakes-discharging operation being carried out by travelling the filter cloth under another condition that the heads are remotest from each other so that the frame members are separated and the other head of the press, which is fixed in conventional filter presses, is also supported movably so that it may be advanced and retracted. A drive apparatus is provided for advancing and retracting said other head between the most retracted position in which the movable frame members are separated and a predetermined advanced position in which the movable frame members are almost closed. Such a filter press may be enlarged in scale for enlarging filtering capacity thereof without enlarging the scale of the hydraulic cylinder, thereby providing considerable savings in cost and space.

2 Claims, 11 Drawing Figures

FILTER PRESS

BACKGROUND

This invention relates to a novel and improved filter press, and more particularly to a filter press which permits reduction in scale of hydraulic cylinder means for tightening a plurality of movable frame members consisting of filter plates or filter plates and filter frame even when the press is enlarged in scale for enlarging filtering capacity.

There has been known to the art a filter press of the type in which a plurality of movable frame members are arranged between a pair of heads with at least one filter cloth supported between adjacent frame members and in which one of the heads is movably supported so that the movable head may be advanced and retracted by hydraulic cylinder means for tightening the frame members. The filtering operation is carried out when the heads are closest to each other so that the frame members are tightened, and the cakes-discharging operation is carried out when the heads are separated from each other.

Filter presses of the above type are shown in, for example, U.S. Pat. Nos. 3,618,782; 3,698,557; and 3,807,567. In the filter press disclosed in U.S. Pat. No. 3,618,782, alternately arranged filter frames and filter plates are employed as the mentioned movable frame members and an endless filter cloth is entrained over guide rollers arranged above and below the filter plates in a zig-zag fashion so that the cloth is disposed between each adjacent filter frame and filter plate. In the filter press disclosed in U.S. Pat. No. 3,698,557, alternately arranged filter frames and filter plates are also employed as the mentioned movable frame members and a pair of endless filter cloths are provided to each of the filter plates by entraining the same over guide rollers arranged above and below each filter plate. Further, in the filter press disclosed in U.S. Pat. No. 3,807,567, recessed filter plates are employed as the movable frame members and a pair of filter cloths between which slurry to be filtered is to be supplied are disposed between each two adjacent filter plates so that the cloths may be travelled downwardly during the cakes-discharging operation. The most important advantage of such filter press is that the cakes-discharging operation is very easy and time-saving because all of the filter cakes on the filter cloth can be discharged or removed so as to clean the cloth at the same time by travelling the cloth in a manner in which the frame members are separated to give definite intervals therebetween.

In the foregoing filter press as of the prior art, the mentioned hydraulic cylinder means for tightening the movable frame members is also used as means for assembling and separating the frame members, namely for advancing and retracting the frame members. In this case, the cylinder means is required to have not only a large driving force but a large stroke. In particular, when the number of the frame members and the filtering area of each filter plate are increased for enlarging the filtering capacity of the filter press according to the recent demand on the filter press, a hydraulic cylinder means for moving and tightening the frame members having a very large stroke and a very large driving force is required. Further, in such filter press, diaphragms of an elastic material for pressing filter cakes so as to dewater the same are often employed which are disposed on the surfaces of the filter plates and into which fluid is supplied under pressure so as to expand the diaphragms for pressing the cakes after a filtering operation as shown, by way of example, in U.S. Pat. No. 3,807,567. In such case, a hydraulic cylinder means for tightening the frame members having a very large driving force is required for bearing the high pressure of the fluid for expanding the diaphragms. Thus, the hydraulic cylinder unit for moving and tightening the frame members is necessarily designed so that it has a large scale, requires a large space for the cylinder means, and has a large manufacturing cost. In particular, the piston rod of such cylinder means must have a large diameter for providing strength against buckling of the long piston rod which receives a large pressure or force and increases the manufacturing cost. Although the length or span of such cylinder means may be shortened by employing a telescopically extensible cylinder unit, such telescopically extensible cylinder unit requires a very large manufacturing cost.

SUMMARY

Accordingly, a primary object of the present invention is to provide a novel filter press of the mentioned type which permits reduction in scale of the tightening cylinder means so as to lower the cost of the press.

Another object of the present invention is to provide a filter press which permits an enlargement in scale of the press so as to increase filtering capacity thereof with ease and with a low cost.

According to the present invention, these objects are achieved by movably supporting the other head, which is fixed in the filter press according to the prior art, so that it may be advanced and retracted, and the driving means is provided for advancing and retracting the other head between the most retracted position and a predetermined advanced position. The driving means which is used only for moving the frame members may be provided at low cost because a large driving force is not required for such moving. Because the movable frame members may be moved or advanced and retracted largely by the driving means through the other head, the hydraulic cylinder means for tightening the frame members may be used only for tightening the members so that the scale of the cylinder means can be reduced considerably, thereby reducing the manufacturing cost and space for the cylinder means.

According to another feature of the present invention, two sets of movable frame members are arranged in series between the machine frames and the other heads for the two sets of movable frame members are made into a common head which is arranged between the two sets. In this case, during a filtering operation by using one set of the assembled and tightened frame members, filter cakes may be discharged from the other set of the separated frame members or the filter cloths thereon so that efficiency of the filtration is increased. This feature is very advantageous particularly when the cakes-discharging operation requires a period of time approximately equal to that for the filtering operation due to the sort of slurry to be filtered.

DESCRIPTION OF THE DRAWING

The features of the present invention and its attendant advantages will become more readily apparent as the specification is considered in conjunction with the accompanying drawings, in which.

DESCRIPTION OF SPECIFIC EMBODIMENT

Figure 1:
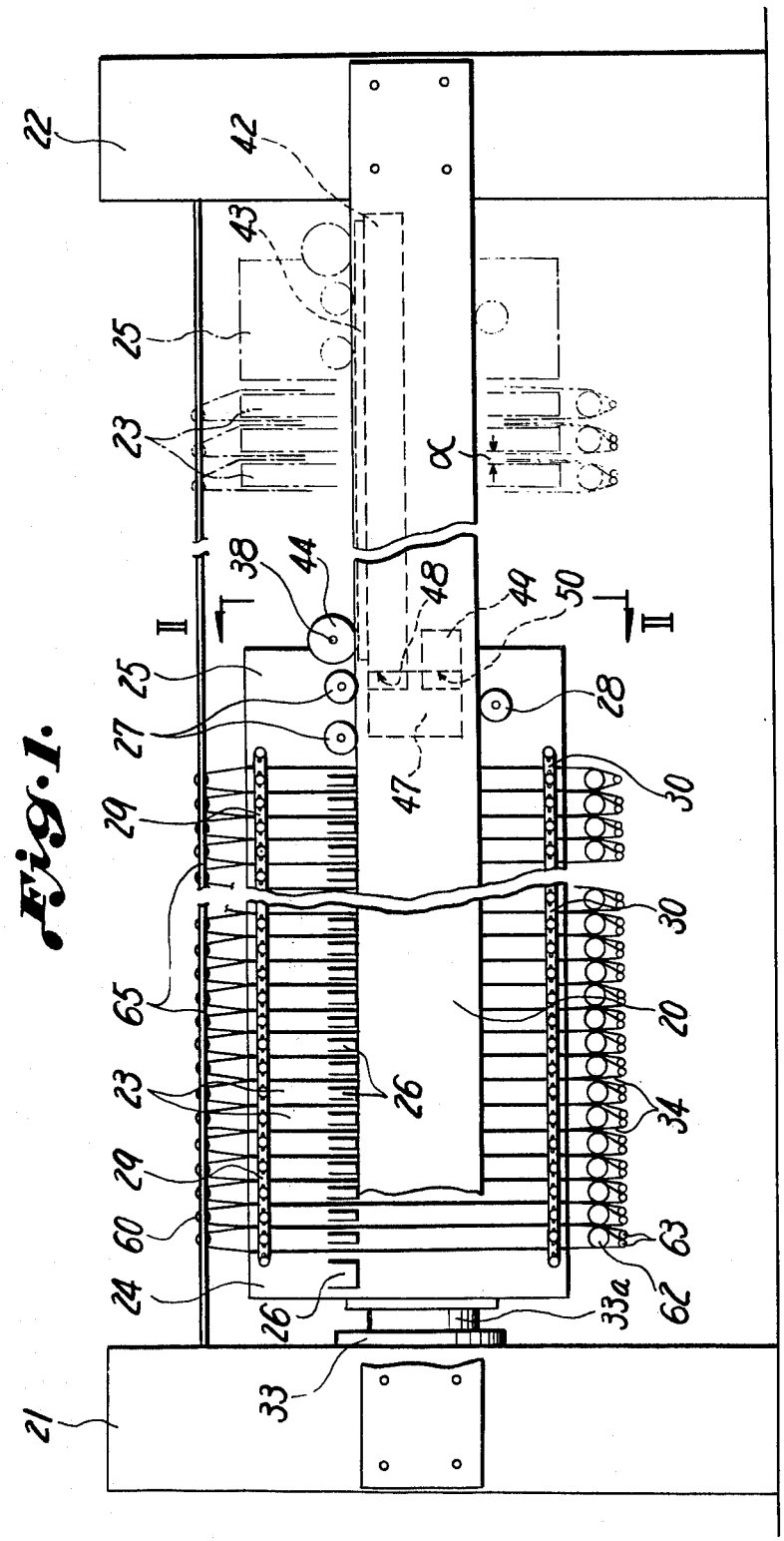
FIG. 1 is an elevational side view, partially cut away, of an embodiment of the filter press according to the present invention.

Referring now to the drawings, there is shown a preferred embodiment of the filter press according to the present invention in FIGS. 1 to 8. The filter press includes a pair of guide rails 20 which are secured to front and rear machine frames 21 and 22 at their ends. As shown in FIG. 1, a plurality of recessed filter plates 23 are arranged between a pair of front and rear heads 24 and 25. Each of the filter plates 23 and the front head 24 are slidably mounted on the rails 20 by means of arms 26 at both sides, and the rear head 25 is also slidably mounted on the rails by means of two pairs of upper rollers or wheels 27 which are rotatably mounted by the head 25. The rear head 25 further includes a pair of lower rollers 28 which are rotably mounted on the head 25 so that the rollers 28 are rotatably engaged with the lower faces of the rails 20. The filter plates 23 and the heads 24 and 25 are connected by a plurality of upper and lower links 29 and 30 having elongated apertures 29a and 30a at both end portions into which pins 31 and 32 projected from the sides of each filter plate and each head are inserted (see FIG. 6) so that all of the plates 23 may be separated at a time to give definite intervals α therebetween by moving the rear head 25 to the most retracted position shown in phantom in FIG. 1. The front head 24 may be moved along the rails 20 by a hydraulic cylinder unit 33 which is fixedly mounted on the front machine frame 21 and the piston rod 33a of which is connected to the front head 24. This cylinder unit 33 is used only for tightening the filter plates 23 so that the stroke of the cylinder unit is made small. The filter press further includes a plurality of filter cloths 34 which are supported in a fashion detailed later to permit travelling of the same so that two cloths 34 are disposed between each two adjacent plates 23.

The rear head 25 which is particularly supported so as to be moved along the rails 20 is driven to move by a driving means that will be explained hereinafter. On the rear head 25 is fixedly mounted an electric motor 35 (FIG. 2) which includes a braking means 36 and a speed-reducing means 37. The output shaft 35a of the motor 35, which may be rotated in either direction, is operatively connected to a horizontally extending rotatable shaft 38, which is rotatably mounted on the rear head 25 by a pair of bearing means 39, by means of a chain 40 entrained over a sprocket wheel 41 on the output shaft 35a and a sprocket wheel 98 on the rotatable shaft 38. On the inner sides of the rails 20 are secured a pair of elongated plate members 42 which extend along the rear half of the rails 20, as shown in FIG. 1. On the plate members 42 are fixedly mounted a pair of racks 43 with which a pair of pinions 44 on the rotatable shaft 38 are meshed. The rear head 25 may thus be advanced toward the front frame 21 or retracted away from the front frame by the motor 35. The rear head 25 is moved along the rails 20 between the most retracted position and a predetermined advanced position as shown in FIG. 1, and, at such end positions, the motor 35 is stopped by the detection of such end positions by limit switch means or the like and is braked.

Figure 2:
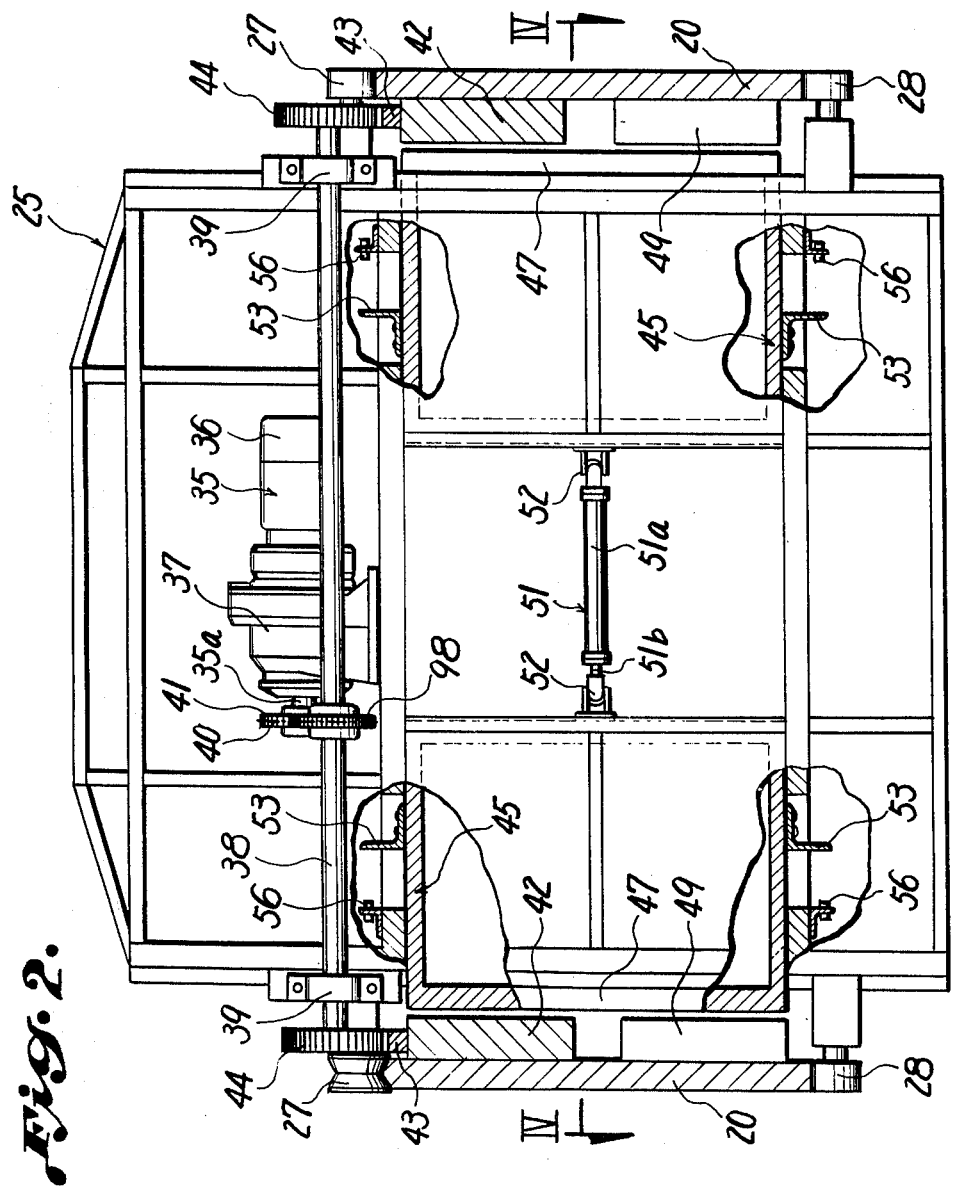
FIG. 2 is an enlarged vertical sectional view, partially cut away, taken along the line II—II of FIG. 1.
Figure 3:
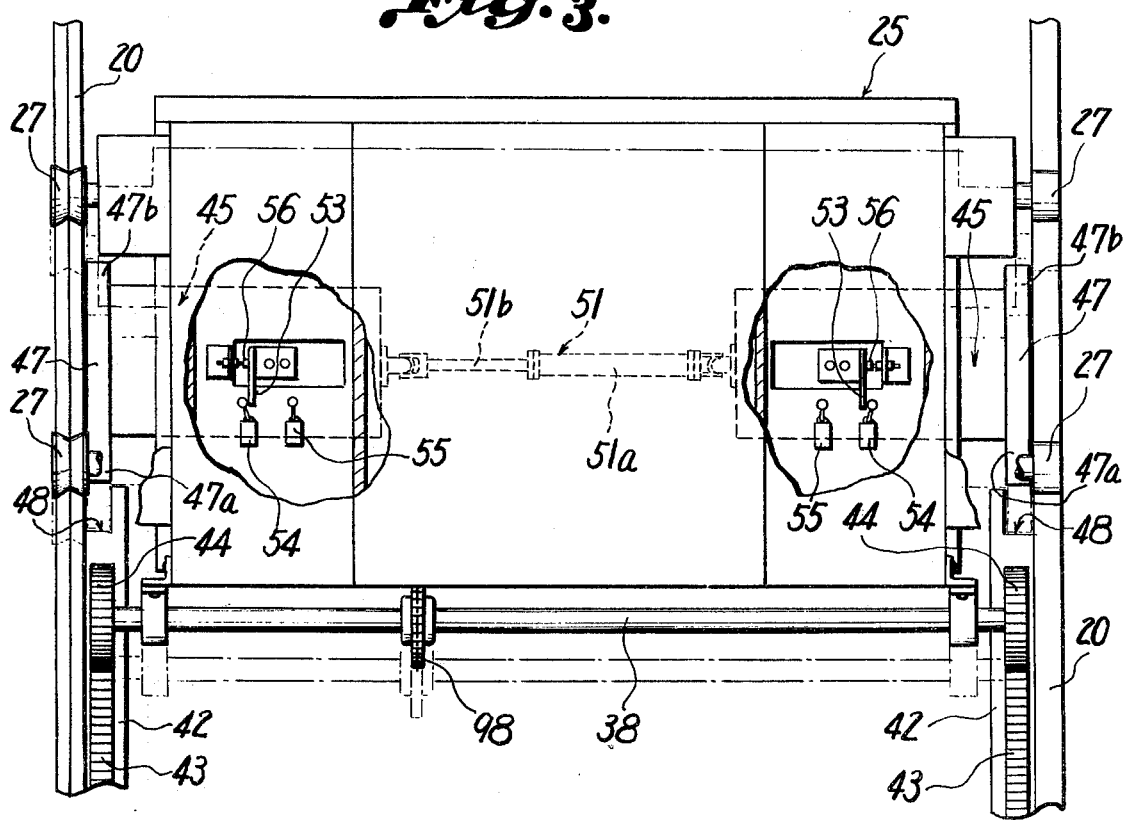
FIG. 3 is a schematic plane view, partially omitted, of a part of the filter press shown in FIG. 1.
Figure 4:
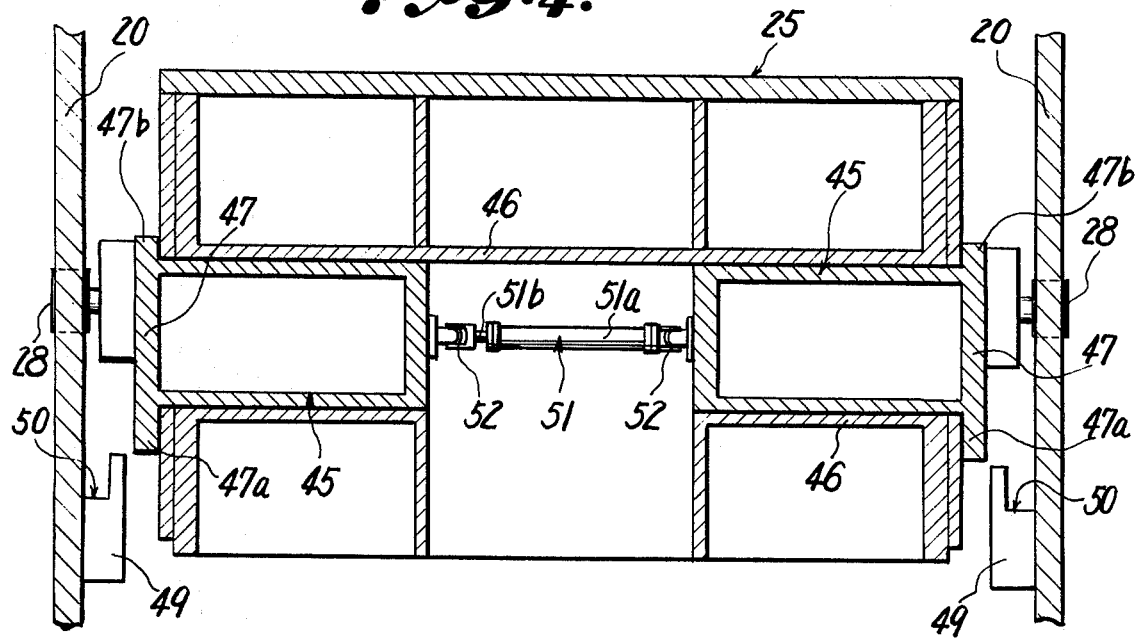
FIG. 4 is a cross-sectional view taken along the line IV—IV of FIG. 2.

For the purpose of restraining the rear head 25 at such predetermined forward position so that the head 25 cannot be retracted, a restraining means shown in FIGS. 2 to 4 is provided which must be released before retracting the rear head. The restraining means includes a pair of movable stopper means 45 which are supported by the rear head through guide ribs 46 so that the stopper means may be projected sidewardly from the rear head and be retracted. The movable stopper means 45 are provided at the free ends thereof with stopper heads 47 having rear and front projections 47a and 47b. The aforestated elongated plate members 42 are provided at their front ends with engaging grooves 48 in which the rear projections 47a of the stopper heads 47 may be received at the upper halves thereof. On the inner sides of the rails 20 are further secured a pair of lower plate members 49 having engaging grooves 50 in which the rear projections 47a of the stopper heads 47 may be received at the lower halves thereof. The movable stopper means 45 are moved between an inner position shown in FIGS. 2 and 4, in which the heads 47 are engaged with the side edges of the rear head, and an outer position shown in FIG. 3.

The movable stopper means 45 are driven laterally inwardly and outwardly by a hydraulic cylinder unit 51 arranged between the left and right stopper means 45. The cylinder 51a and piston rod 51b of the unit 51 are connected to the left and right stopper means 45, respectively, by universal joint means 52. The movement of the movable stopper means 45 is controlled by a mechanism which will be detailed hereinafter. Each of the stopper means 45 is provided with upper and lower dog means 53, each of which is engageable with a limit switch means 54 for detecting the outermost position of the stopper means and a limit switch means 55 for detecting the innermost position of the stopper means. The left and right limit switch means 54 are connected in series so that the extending operation of the cylinder unit 51 is stopped during laterally outward movement of the stopper means 45 only when both of the left and right limit switch means 54 detect the movement of the left and right stopper means 45 into the outermost positions thereof. The left and right limit switch means 55 are also connected in series so that the retracting operation of the cylinder unit 51 is stopped during inward movement of the stopper means 45 only when both of the left and right limit switch means 55 detect the movement of the left and right stopper means 45 into the innermost positions thereof. At the outermost position of each movable stopper means 45, the dog means 53 associated therewith also engage upper and lower stopper bolts 56, which are fixedly mounted on the rear head, so that the outer movement of each stopper means 45 is stopped. Before a filtering operation, the rear head 25 is advanced from the rearmost position thereof (shown in phantom in FIG. 1) to a forwarded position shown in FIG. 3, and then the movable stopper means 45 are moved laterally into the outermost positions thereof shown in FIG. 3. When the tightening cylinder unit 33 is then operated to tighten the filter plates 23, the rear head 25 is slightly retracted together with the projected stopper means 45 mounted thereon so that the rear projections 47a of the stopper head 47 of the stopper means 45 are inserted into the engaging grooves 48 and 50 of the plate members 42 and 49, whereby the rear head 25 is restrained so that the head 25 cannot be retracted any more.

Figure 5:
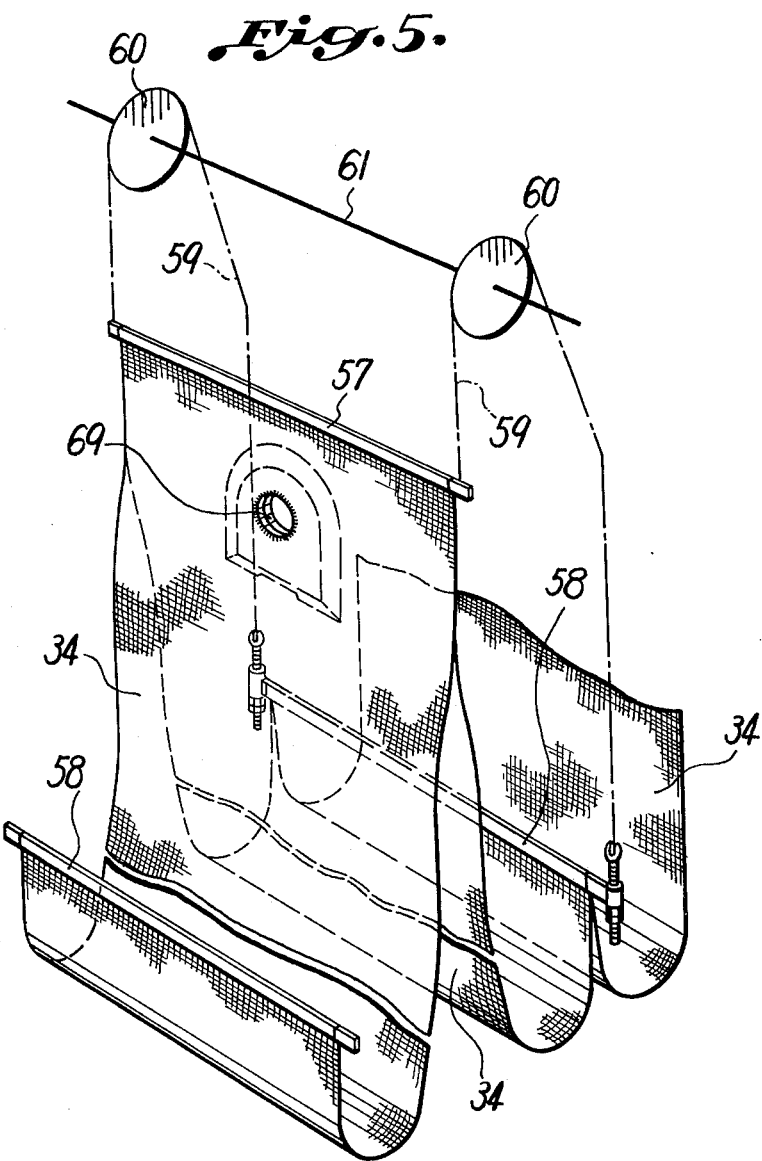
FIG. 5 is a perspective view, partially cut away, of filter cloths employed in the filter press shown in FIG. 1.
Figure 6:
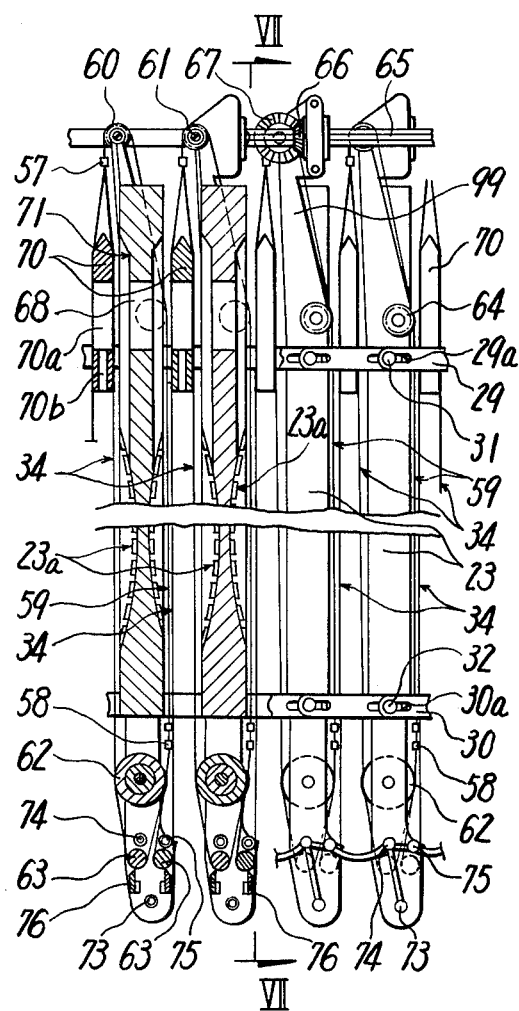
FIG. 6 is an enlarged side elevational view, partially in section and partially cut away, of a part of the filter press shown in FIG. 1 showing a state where filter plates are separated.
Figure 7:
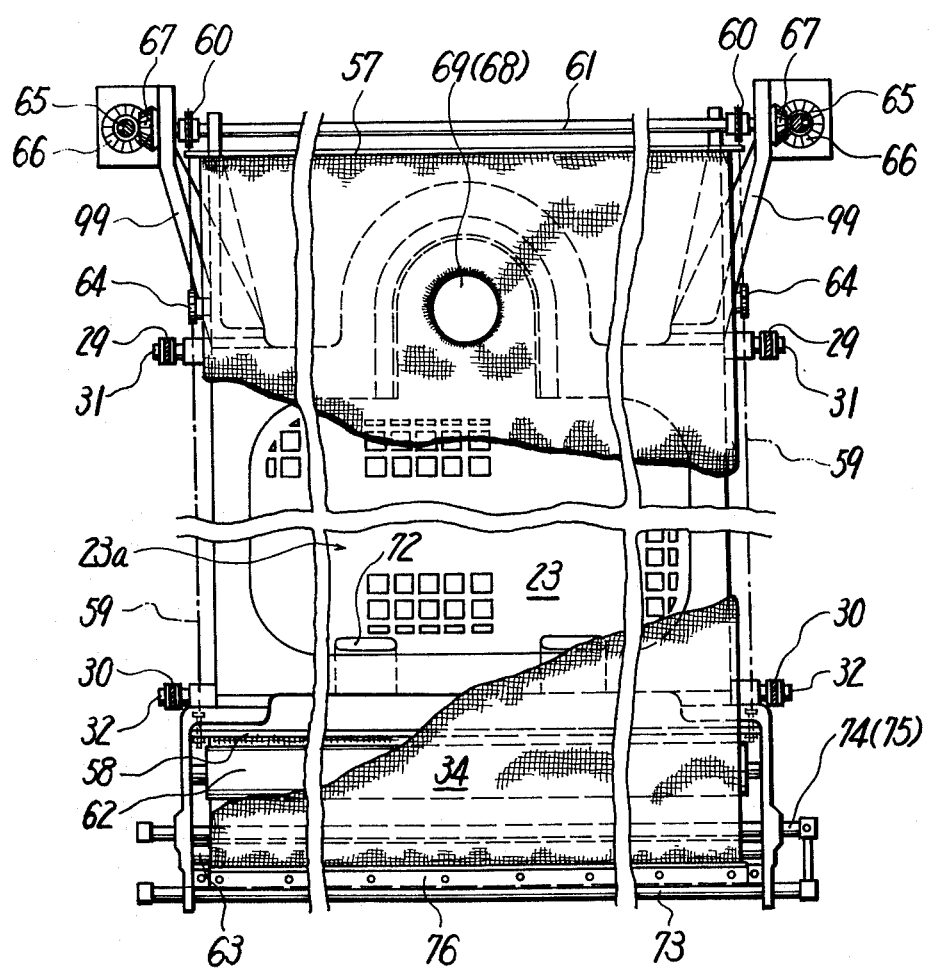
FIG. 7 is an elevational view, partially cut away, seen from arrows VII—VII of FIG. 6.

As shown in FIG. 5, two filter cloths 34 disposed between each two adjacent filter plates 23 are connected to a common upper support bar 57, and two filter cloths 34 covering the front and rear surfaces of each plate 23 are connected to a common lower support bar 58. To the lower and upper support bars 57 and 58 are connected a pair of chains 59 which are entrained on a pair of sprocket wheels 60 on a rotatable shaft 61 arranged above each filter plate 23, as shown in FIGS. 6 and 7. The filter cloths 34 are entrained over guide rollers 62 having elastically deformable surfaces and guide rollers 63 below the plate 23 so that, when the rotatable shaft 61 is rotated, the cloths are lowered and raised in a seesaw-like manner. The chains 59 are also entrained on guide sprocket wheels 64. As shown in FIGS. 1, 6 and 7, a pair of drive shafts 65 are bridged between the front and rear machine frames 21 and 22. On the drive shafts 65 are slidably but not rotatably mounted a plurality of bevel gears 66 rotatably supported by the plates 25 through arms 99 which gears in turn are meshed with pairs of bevel gears 67 fixedly mounted on the rotatable shafts 61. Thus, when the drive shafts 65 are rotated in one or the other direction by a prime mover (not shown in the drawings), the rotatable shafts 61 are rotated so that the filter cloths 34 are lowered or raised. Such supporting mechanism of filter cloths for permitting travelling of the cloths and such driving mechanism of filter cloths are known to the art and are detailed fully in, for example, the aforementioned U.S. Pat. No. 3,807,567.

In the filter press shown in FIGS. 1 to 8, slurry to be filtered is supplied between each two filter cloths located between each two adjacent filter plates 23 through slurry passages 68 and 69 perforated through the filter plates 23 and filter cloths 34 and through feeding devices 70, each of which is secured to the filter cloths located between each two adjacent filter plates and each of which has a horizontal passage 70a and a vertical passage 70b. Each of the filter plates is provided at the upper portions of both surfaces thereof with grooves or recesses 71 by which the feeding device 70 is received when the plates 23 are assembled and tightened. Filtrate is discharged from cloth-supporting beds 23a through filtrate-discharging passages 72. Below each filter plate 23 are arranged tubes 73, 74 and 75 for jetting washing water toward the outer and inner surfaces of the cloths 34 and scrapers 76 for scraping off filter cakes from the outer faces of the cloths 34. These structures are also detailed fully in, for example, U.S. Pat. No. 3,807,567.

Before a filtering operation, the rear head 25 is advanced by the motor 35 from the rearmost position to the predetermined forward position shown in FIG. 3, and then the movable stopper means 45 are projected sidewardly by the cylinder unit 51 from the innermost position to the outermost position in which the stopper heads 47 thereof may be received by the engaging grooves 48 and 50 when the head 25 is somewhat retreated, as shown in FIG. 3. Then, the hydraulic cylinder unit 33 is operated so as to move the front head 24 toward the rear head 25 so that the filter plates 23 are tightened because the rear head 25 is restrained from retreating, after a slight retreating movement thereof, due to engagement of the stopper heads 47 in the engaging grooves 48 and 50. It is to be noted that the filter plates 23 have been assembled almost completely already when the rear head 25 has been advanced to the aforementioned predetermined forward position so that the cylinder unit 33 need be extended only very slightly to obtain the required tightening of the plates 23, whereby the required stroke of the cylinder unit 33 is considerably reduced even if the number of the filter plates is large.

Figure 8:
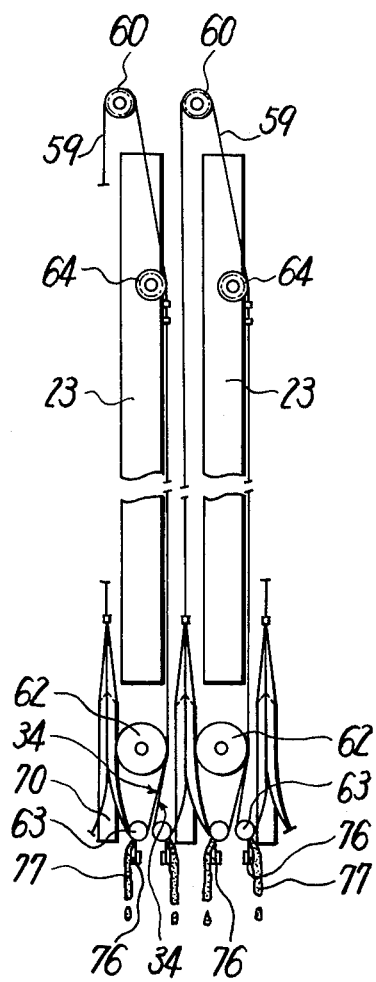
FIG. 8 is a side elevational view, partially cut away, of two adjacent filter plates showing cakes-discharging operation in the filter press shown in FIG. 1.

After a filtering operation, the hydraulic cylinder unit 33 is retracted and then, after advancing the rear head 25 slightly so as to disengage the stopper heads 47 from the engaging grooves 48 and 50, the movable stopper 45 are retracted laterally inwardly by the cylinder unit 51 so as to release the restraining of the rear head 25. The motor 35 is then operated to move the rear head 25 to its most retreated position, shown in FIG. 1 in imagined lines. In this position the filter plates 23 are separated, as shown in FIG. 6. After this, the drive shafts 65 are rotated in one direction so that all of the filter cloths 34 are lowered at the same time and turned upwardly around the rollers 63 below the plates 23, as shown in FIG. 8. At this time, filter cakes 77 on the cloths 34 are scraped off by the scrapers 76. The drive shaft 65 is then rotated in the other direction so that all of the filter cloths 34 are raised at the same time from the lowered position shown in FIG. 8 to the raised position shown in FIG. 6, and, during such upward travel of the cloths 34, washing water is jetted by the tubes 73, 74 and 75 to clean the filter cloths. The scrapers 76 may be omitted in a case in which the cakes 77 are removed automatically from the surface of the filter cloths 34 when the cloths are travelled around the rollers 63 due to the small curvature of the rollers 63.

Figure 9:
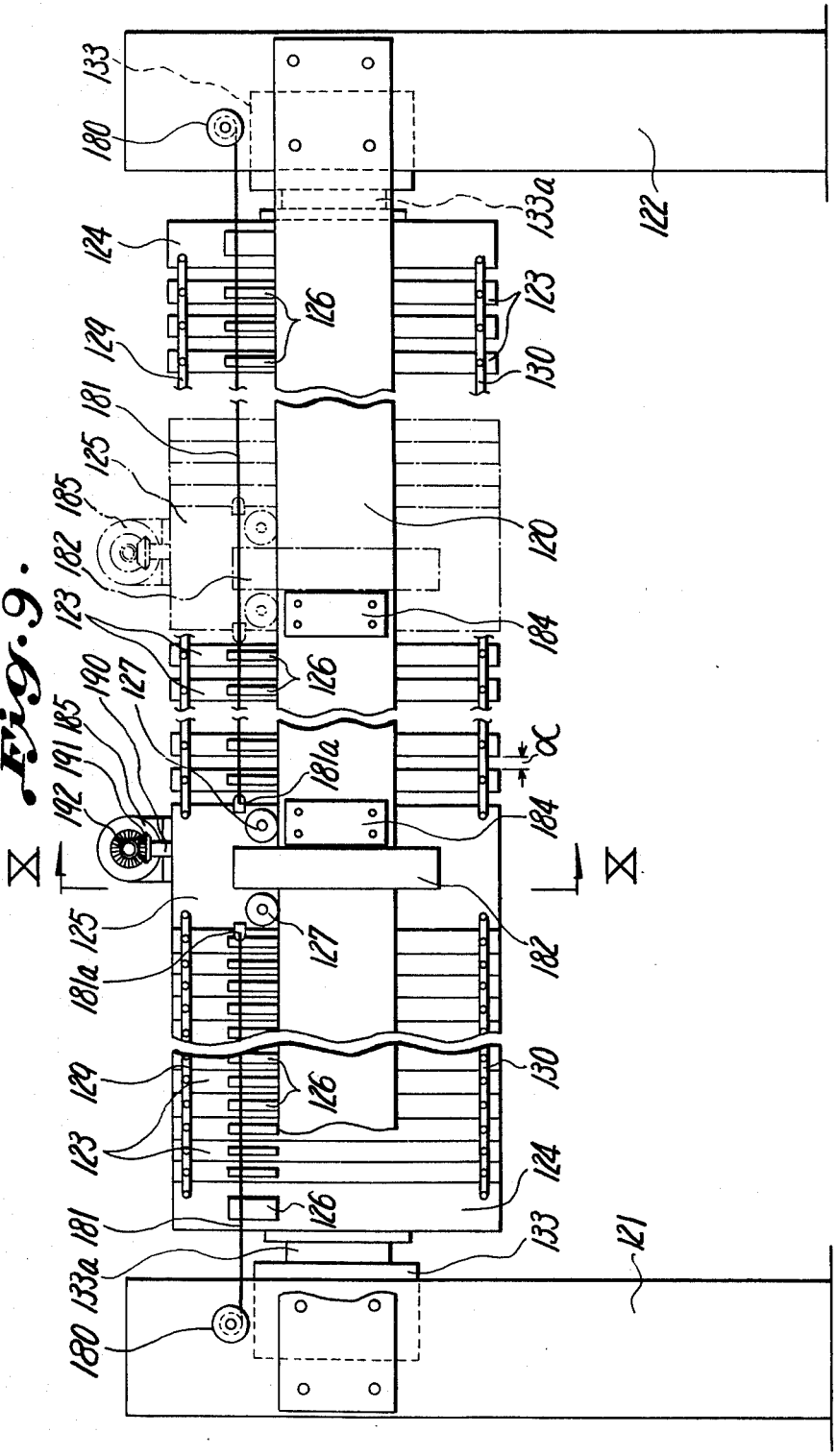
FIG. 9 is an elevational side view, partially cut away, of another embodiment of the filter press according to the present invention.
Figure 10:
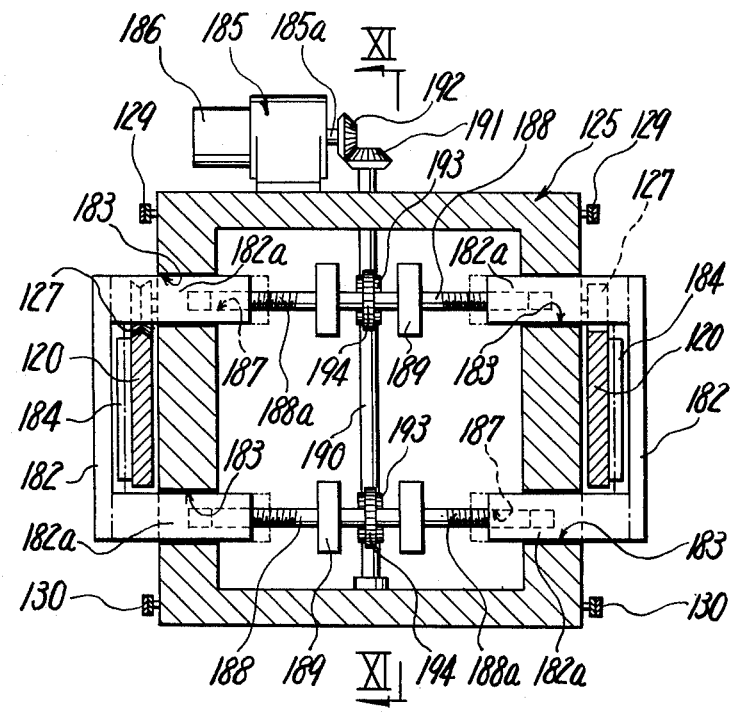
FIG. 10 is a vertical sectional view taken along the line X—X of FIG. 9.
Figure 11:
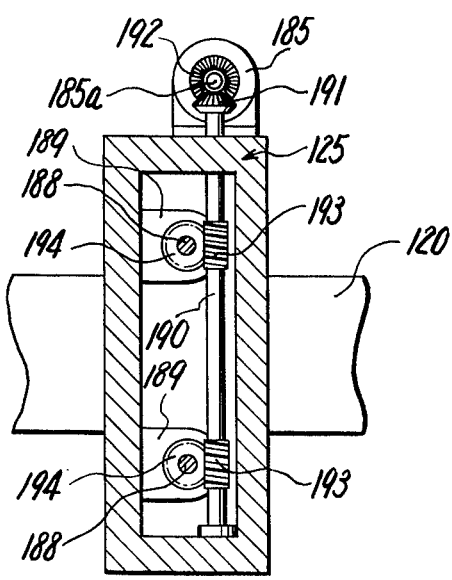
FIG. 11 is a vertical sectional view taken along the line XI—XI of FIG. 10.

Turning to a consideration of FIGS. 9 to 11, there is shown another preferred embodiment of the filter press according to the present invention. In the filter press of this embodiment, two sets of filter plates 123 are arranged in series between machine frames 121 and 122. In this press, rear heads for the sets of filter plates 123 corresponding to the rear head 25 employed in the first embodiment shown in FIGS. 1 to 8 are made into a common head 125 which is arranged between the two sets of the filter plates 123. That is, the front heads 124 and filter plates 123 for the sets and the common rear head 125 are slidably mounted on common guide rails 120 bridged between the machine frames 121 and 122, and two sets of upper and lower links 129 and 130 are provided so that, when the common rear head 125 is positioned at respective end positions shown in FIG. 9, the filter plates 123 in one of the sets are separated so as to give definite intervals α therebetween while the filter plates 123 in the other set are assembled.

The rear head 125 is slidably mounted on the rails 120 by two pairs of rollers or wheels 127 which are rotatably mounted on the head 125. On the machine frames 121 and 122 are fixedly mounted a pair of winch means 180 which are connected respectively to the rear head 125 by winch ropes 181 which may be wound up by the winch means 180 and which are fixedly secured to the rear head at one end 181a. Thus, when one of the winch means 180 is operated so as to wind up the winch rope 181 associated therewith while the other winch means 180 is made freely rotatable, the head 125 is moved along the rail 120 toward the former winch means.

For the purpose of restraining the rear head 125 at each end position shown in FIG. 9, a restraining means is provided. As shown in FIG. 10, the restraining means include a pair of movable stoppers 182 in the form of U-shaped gates the legs 182a of which are slidably received by apertures 183 formed through the head 125 so that the stoppers supported by the head 125 may be moved in the direction across the head 125. The restraining means further includes two pairs of fixedly arranged stopper plates 184 which are secured to the outer faces of the rails 120, as shown in FIG. 9. As also shown in FIG. 9, the movable stoppers 182 may be engaged with the respective stopper plates 184 at respective end positions of the rear head 125.

The movable stoppers 182 are driven movable laterally inwardly and outwardly by an electric motor 185 having a braking means 186 and a speed-reducing mechanism not shown in the drawings. The legs 182a of the movable stoppers 182 are provided with threaded holes 187 into which a pair of horizontally extending threaded shafts 188 are screwed. Each of the shafts 188 has a pair of threaded portions 188a at the ends, the thread directions of which are opposite. Thus, the movable stoppers 182 of both sides are moved outwardly or inwardly at the same time when the shafts 188 are rotated. The threaded shafts 188 which are rotatably supported by the rear head 125 through bearing means 189 are operatively connected to the motor 185 through a vertically extending shaft 190 which is rotatably supported by the head 125. That is, the vertical shaft 190 has thereon a bevel gear 191 meshed with a bevel gear 192 on the output shaft 185a of the motor 185 and a pair of worms 193 which are meshed with worm wheels 194 on the horizontal shafts 188. Thus, when the motor 185 is driven in one or the other directions, the movable stoppers 182 are moved either inwardly or outwardly. Each of the movable stoppers 182 may be moved between the outermost position shown in FIG. 10, in which the stopper is disengaged from the stopper plates 184, and the innermost position shown in FIG. 10 in imagined lines in which the stopper is engaged with the stopper plates 184 so that the head 125 cannot be retreated. In addition, the motor 185 is stopped at such end positions of the movable stoppers 182 shown in FIG. 10 by the detection of such positions by limit switch means not shown in the drawings and is braked.

The other parts of the filter press shown in FIGS. 9 to 11 are constructed similarly to those of the filter press shown in FIGS. 1 to 8 and are designated by reference numerals larger by one hundred than the numerals used in FIGS. 1 to 8 for designating such parts. In addition, although filter cloths and supporting and driving mechanisms for such cloths are omitted from the drawings in FIGS. 9 to 11, they may be constructed in the fashion shown in FIGS. 1 to 8 or in any other fashion known to the art.

Before a filtering operation by using the filter press shown in FIGS. 9 to 11, the head 125 is forwarded by either of the winch means 180 into either of the end positions thereof shown in FIG. 9, and then the movable stoppers 182 are moved inwardly by the motor 185 so as to restrain the head 125 at such end position. The hydraulic cylinder unit 133 is then operated to tighten the assembled filter plates 123 of one set. In this case, said one set of the filter plates are ready to carry out a filtering operation whereas the other set of the filter plates are separated so as to be ready to carry out a cakes-discharging operation, as can now easily be understood.

After a filtering operation by using one set of the filter plates and cakes-discharging operation for the other set of the filter plates or the filter cloths associated therewith, which discharging operation may be carried out together with the filtering operation by using said one set of the filter plates, the hydraulic cylinder unit 133 is contracted and the movable stoppers 182 are moved downwardly to release the restraining of the head 125 by the stoppers. The filter plates 123 of said one set are then separated for a cakes-discharging operation by moving the head 125 and, at the same time, the filter plates 123 of said the other set are assembled and tightened for a further filtering operation.

The filter press shown in FIGS. 9 to 11 is very advantageous, because the period of time in which filtering operations are interrupted is very short and because distance or space for the separation of two sets of filter plates is made common so that such distance or space required for the separation of filter plates is small.

Although examples have been shown in which the present invention is applied to the recessed plate type filter press, the present invention is also applicable to the plate and frame type filter press such as shown in U.S. Pat. Nos. 3,618,782 and 3,698,557. In the plate and frame type filter press disclosed in U.S. Pat. No. 3,618,782, all of the filter frames having filter cakes therein are lowered after a filtering operation and after the filter plates and filter plates have been separated, so that the filter cakes are discharged from the lowered filter frames by at least one discharging plate forwarded through the filter frames, and an endless filter cloth employed in the filter press is travelled only for the purpose of removing residues of such cakes thereon. Notwithstanding this, the present invention may also be applied to this filter press so that the hydraulic cylinder unit for tightening the filter frames and filter plates may be reduced in scale.

The most characteristic feature of the present invention is that one of the heads which is fixed in position in a conventional filter press is made movable and the head is moved between the most retreated position, in which the movable frame members for the press are completely separated, and a predetermined forwarded position in which the movable frame members are almost assembled, thereby eliminating the aforementioned disadvantage of the conventional filter press.

What is claimed is:

1. A filter press comprising:

a. front and rear spaced movable heads disposed in face-to-face relation;

b. a plurality of movable frame members which are arranged between said movable heads so that the frame members may be advanced and retracted;

c. connecting means for connecting said movable frame members and movable heads so that the frame members may be separted to give definite intervals therebetween;

d. at least one filter cloth disposed between each two adjacent movable frame members and supported so that the cloth may be moved;

e. driving means for moving said filter cloth;

f. hydraulic cylinder means associated with one of said movable heads so that the said movable head may be advanced and retracted for tightening and separating said movable frame members;

g. driving means for advancing and retracting the other movable head between a most retracted position and a predetermined advanced position; and h. restraining means for releasably restraining said other movable head at said predetermined advanced position, said restraining means including at least one fixed stopper means fixedly arranged laterally outwardly of said movable frame members and at least one movable stopper means which is supported by said other movable head so that it may be moved laterally outwardly from the movable frame members so as to engage said fixed stopper means.

2. The filter press of claim 1 including drive means for said movable stopper means.

* * * * *